United States Patent [19]

Wohlert et al.

[11] 4,432,034
[45] Feb. 14, 1984

[54] BRIDGE RECTIFIER FOR SELECTIVELY PROVIDING A FULL-WAVE OR A HALF-WAVE RECTIFIED VOLTAGE

[75] Inventors: Andrew M. Wohlert; Frederick A. Miller, both of St. Charles; Verne E. Dietrich, Glen Ellyn, all of Ill.

[73] Assignee: Spraying Systems Co., Wheaton, Ill.

[21] Appl. No.: 307,003

[22] Filed: Sep. 30, 1981

[51] Int. Cl.³ .................................. H01H 47/04
[52] U.S. Cl. .......................... 361/154; 361/194; 363/126; 363/128
[58] Field of Search ............... 361/154, 194; 363/85, 363/88, 100, 125–128, 142, 143

[56] References Cited

U.S. PATENT DOCUMENTS

| | | | |
|---|---|---|---|
| 2,970,247 | 1/1961 | Hill | 361/152 |
| 3,140,429 | 7/1964 | Mais | 361/154 |
| 3,666,998 | 5/1972 | Wielebski | 361/154 |
| 3,671,761 | 6/1972 | Shibuya et al. | 361/205 |
| 3,737,736 | 6/1973 | Stampfli | 361/205 |
| 3,781,646 | 12/1973 | Dheilly | 363/88 |
| 3,943,416 | 3/1976 | Degenhart | 361/194 |

FOREIGN PATENT DOCUMENTS

| | | | |
|---|---|---|---|
| 2359252 | 6/1975 | Fed. Rep. of Germany | 363/143 |
| 2421136 | 11/1975 | Fed. Rep. of Germany | 361/194 |
| 3009194 | 9/1981 | Fed. Rep. of Germany | 363/126 |
| 613311 | 6/1978 | U.S.S.R. | 363/128 |
| 799025 | 1/1981 | U.S.S.R. | 361/194 |

Primary Examiner—William H. Beha, Jr.
Attorney, Agent, or Firm—McWilliams, Mann, Zummer and Sweeney

[57] ABSTRACT

An automatic power reduction circuit having a single silicon controlled rectifier in one leg of a bridge rectifier which is gated off when a capacitor reaches a predetermined voltage level so as to switch automatically the bridge output from a full-wave rectifier to a half-wave rectifier. An auxiliary silicon controlled rectifier is also provided to facilitate the quick discharge of the capacitor so as to reset the circuit to its initial state, thereby allowing fast, repeated operations and preventing malfunctioning upon a loss of power.

9 Claims, 4 Drawing Figures

4,432,034

BRIDGE RECTIFIER FOR SELECTIVELY PROVIDING A FULL-WAVE OR A HALF-WAVE RECTIFIED VOLTAGE

BACKGROUND OF THE INVENTION

1. Field of the Invention

This invention relates generally to controllable rectifier circuits, and more particularly it relates to a controllable rectifier circuit which automatically reduces the power to a load after a predetermined period of time has elapsed. The invention has particular applications in which the load is a solenoid coil so that full power is applied during the initial pull-in of the coil but reduces the power to a relatively low level after the need for full power is no longer required.

2. Description of the Prior Art

In U.S. Pat. No. 3,161,759, issued to Gambill et al. on Dec. 15, 1964, there is described a control circuit for varying the output of an electric heater which includes the combination of a silicon controlled rectifier and a capacitor operatively connected in a bridge rectifier.

In U.S. Pat. No. 3,663,943, issued to Nakajima et al. on May 16, 1972, there is described an automatic voltage regulating system for a DC load wherein a capacitor is connected between the gate and cathode of a silicon controlled rectifier to turn on the same when the voltage on the capacitor has reached a predetermined level.

In U.S. Pat. No. 4,118,768, issued to Wilson on Oct. 3, 1978, there is disclosed a rectifier and preregulator circuit using a first silicon controlled rectifier to rectify AC voltage, and the rectified voltage is applied across a capacitor.

In U.S. Pat. No. 4,118,769 issued to Wilson on Oct. 3, 1978, there is shown a full-wave demand controlled pre-regulating supply which includes first and second rectifiers for supplying a rectified current or voltage to a storage capacitor located at the output of the circuit.

In U.S. Pat. No. 4,161,022, issued to Kanazawa et al. on July 10, 1979, there is disclosed an AC to DC power supply utilizing a full-wave bridge rectifier incorporating silicon controlled rectifiers to selectively produce a half-wave or a full-wave rectified signal.

None of the above prior art teaches or suggests a controllable rectifier circuit like that of the present invention which provides a full-wave bridge rectifier circuit with only one of the legs having a silicon controlled rectifier. The silicon controlled rectifier is turned off automatically by a control means after a predetermined time has elapsed so as to convert the bridge rectifier from a full-wave rectifier to a half-wave rectifier.

Generally, it is known that there are many electromagnetically-actuated devices which require more power to actuate the device than is needed to keep the device in the actuated position. Specifically solenoids, relays, contactors, and some motors, among others, can function with a greatly reduced power input once the initial power to close the solenoid, relay, or contactors has actuated the device. Lightly loaded DC motors can operate at either reduced field voltage or reduced armature voltage once the motor has overcome the inertia of the motor and load and the motor has reached operating speed.

This invention includes a full-wave bridge rectifier circuit to apply full power to actuate the device that is associated with it and then, after a predetermined time, reduces the power to the device by changing from a full-wave rectified DC voltage to a half-wave rectified DC voltage. While the invention was developed with a solenoid-actuated valve in mind, the principles can apply equally to other devices.

Although DC solenoids have many advantages over AC solenoids, the use of AC solenoids is widespread because AC voltage is more readily available. The use of a full-wave rectifier in conjunction with the DC solenoid allows the advantages of the DC device to be employed with an AC mains.

The DC solenoid is smaller and lighter than the equivalent AC solenoid for the same stroke and pull force, and it does not require shading coils and laminated iron that are associated with AC solenoids. However, DC solenoids require only a fraction of the actuating power to keep them actuated. The one advantage an AC solenoid has over a DC solenoid is that the power input to the AC solenoid reduces when the solenoid completes its magnetic circuit on actuation. The power consumed by an AC solenoid is limited by its inductance. The inductance is much greater with an actuated plunger than when the plunger is not actuated. Although the DC solenoid draws the same power regardless of the state of the plunger, the other advantages of the DC solenoid are such that many are operated from AC mains using full-wave bridge rectifiers incorporated into the solenoid itself.

There have been a number of methods used heretofore to reduce the power to DC solenoids upon full actuation. One that is commonly used is to have two coils on the solenoid. One coil has a fairly low resistance and is used to initially actuate the solenoid. The other coil has a high resistance and is used to hold the solenoid in the actuated position. A switch, which is operated by the movement of the solenoid plunger, is used to switch the voltage from the low resistance coil to the high resistance coil upon actuation. This requires two coils, a mechanical linkage, switch, and, if operated from the AC mains, a rectifier or rectifiers. The subject invention accomplishes the same result as the two coil solenoid with a switch, in less space and at a much reduced cost. The subject invention allows the solenoid to automatically switch, after a predetermined time, to a reduced power condition where the hold-in power is approximately 30 percent of the actuating power.

When using an automatic switch that switches after a predetermined time, if a short power outage occurs, say in the order of two full cycles of 60 cycle power, the device must be able to reset itself so that full power is applied to the solenoid when the power outage is over. A simple resetting circuit is incorporated in this invention that allows the circuit to reset itself in less time than the solenoid takes to open when power to the device is interrupted. This allows the subject invention to be used without danger of failure when short power outages occur. In addition, if the application requires repeated switching of the solenoid on and off, the frequency at which the solenoid can be operated is not limited by the subject circuit but by the drop out time of the solenoid itself.

SUMMARY OF THE INVENTION

Accordingly, it is a general object of the present invention to provide an improved energy conserving circuit which automatically reduces the power to a load after a predetermined time so as to minimize power dissipation.

It is another object of the present invention to provide an energy conserving circuit including a full-wave bridge rectifier circuit with only one of the legs having a silicon controlled rectifier.

It is another object of the present invention to provide an energy conserving circuit in which a single silicon controlled rectifier is turned off automatically by a control means after a predetermined time has elapsed so as to convert the bridge rectifier from a full-wave rectifier to a half-wave rectifier.

It is still another object of the present invention to provide an energy conserving circuit including an auxiliary silicon controlled rectifier for facilitating quick discharging of a control means so as to reset the energy conserving circuit.

It is still yet another object of the present invention to provide an energy conserving circuit for automatically reducing power to a DC load after a predetermined time which has a relatively simple circuit configuration and which can be manufactured easily at an inexpensive cost.

In accordance with these aims and objectives, there is provided in the present invention an energy conserving circuit comprising input means, output means, a DC load such as a solenoid coil operatively connected to the output means, a bridge rectifier operatively coupled between input and output means, and control means operatively connected to the bridge rectifier so as to convert automatically a full-wave rectified voltage fed to a DC load from an AC source to a half-wave rectified voltage after a predetermined time has elapsed. The bridge rectifier has a first current path including a pair of diodes for conducting positive half-cycles of the AC source and a second current path including a silicon controlled rectifier for conducting negative half-cycles of the AC source. The control means includes a capacitor for automatically biasing the silicon controlled rectifier to a non-conductive state after a predetermined time has elapsed so as to reduce the power dissipation in the load. Both the positive and negative half-cycles of the AC source are applied to the load when the silicon controlled rectifier is in the conductive state, and only the positive half-cycles of the AC source are applied to the load when the silicon controlled rectifier is in the non-conductive state. Further, an auxiliary silicon controlled rectifier can be operatively connected to the capacitor for facilitating its quick discharging so as to reset the circuit.

BRIEF DESCRIPTION OF THE DRAWINGS

These and other objects and advantages of the present invention will become more fully apparent from the following detailed description when read in conjunction with the accompanying drawings wherein.

DESCRIPTION OF THE PREFERRED EMBODIMENTS

Figure 1:
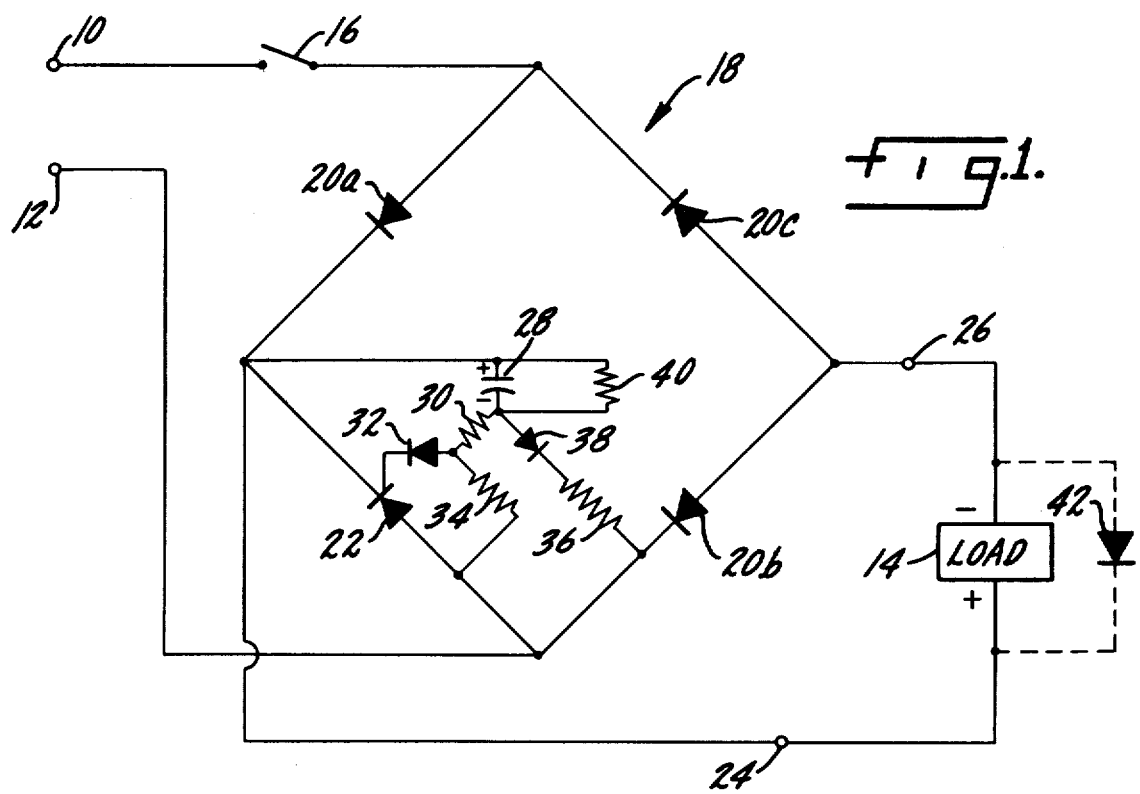
FIG. 1 is a schematic diagram of the energy conserving circuit in accordance with the present invention to accomplish the automatic power reduction.

Referring now in detail to the drawings, there is shown in FIG. 1 the energy conserving circuit of the present invention for reducing automatically the power supplied to a load after a predetermined time. The energy conserving circuit includes a pair of input terminals 10 and 12 for applying an AC source or potential from an AC mains to a load 14 upon the closing of a power line switch 16. A bridge rectifier 18 is provided which consists of diodes 20a, 20b, and 20c in three of the legs and a silicon controlled rectifier (SCR) 22 in the remaining fourth leg. The bridge rectifier 18 is coupled to the input terminals 10 and 12 to receive the AC potential and includes a pair of output terminals 24 and 26 across which the load 14 is connected.

When the terminal 10 of the AC mains is positive with respect to the terminal 12, a first current path extends from the input terminal 10 through the switch 16 and the diode 20a, to the output terminal 24, through the load 14, to the output terminal 26 and then back to the input terminal 12 via the diode 20b. Conversely, when the terminal 12 is positive with respect to the terminal 10, a second current path extends from the input terminal 12, through the SCR 22, to the output terminal 24, through the load 14, to the output terminal 26 and then back to the input terminal 10 via the diode 20c and the switch 16. Each positive half-cycle of the applied AC potential is passed from the input terminal 10 through the first current path to the load 14 via the output terminal 24. Each negative half-cycle of the applied AC potential is passed from the input terminal 12 through the second current path to the load 14 via the output terminal 24. It should be understood that the operation of the bridge rectifier 18 is dependent upon the conduction of the SCR 22. Assuming that the SCR is conductive during the negative half-cycles, then the bridge functions as a full-wave rectifier. On the other hand, if the SCR is non-conductive during the negative half-cycles, then the bridge functions as a half-wave rectifier.

A circuit control means is provided to turn off the SCR for converting automatically the bridge from a full-wave rectifier to a half-wave rectifier. The control means includes a capacitor 28, a resistor 30, and a diode 32 connected in series across the gate and cathode terminals of the SCR 22. At the junction of the resistor 30 and the diode 32, there is connected one end of a resistor 34. The other end of the resistor 34 is coupled to the anode of the SCR. Another resistor 36 is also coupled at its one end to the anode of the SCR, the other end being connected in series to the cathode of a diode 38. The anode of the diode 38 is connected to the junction of the resistor 30 and the capacitor 28. A resistor 40 is coupled in parallel across the capacitor 28. If the load 14 is inductive such as when a solenoid coil is used, then a "free-wheeling" diode 42 is connected across the load to keep the current flowing continuously therethrough and thus preventing a voltage surge or spike to appear across the output.

In describing the mode of operation of the abovedescribed energy conserving circuit, it is first assumed that the voltage across the capacitor 28 is zero and that a negative half-cycle of the input AC voltage appears at the input terminals 10 and 12 so as to apply a positive voltage to the anode of the silicon controlled rectifier 22 when the switch 16 is closed. Since the voltage at the gate of the SCR is initially zero, when the anode becomes positive, current that flows through resistor 34 will gate the SCR on. Thus, the negative half-cycle will be applied through the second current path to the load 14 via the output terminal 24. As the capacitor 28 is charged up in the polarity shown through the diode 38 and resistors 30, 34, and 36 to a predetermined voltage level, the potential at the junction of the resistors 30 and 34 will be negative with respect to the cathode of the SCR, thereby turning off automatically the SCR. Thereafter, no negative half-cycles of the AC voltage are delivered to the load 14. Of course, it can be seen that the positive half-cycles of the AC voltage will always be applied via the first current path to the load 14. Accordingly, the turning off of the SCR serves to convert automatically the delivery of a full-wave rectified voltage to the load 14 to a half-wave rectified voltage. When the energy conserving circuit is first energized by closing of the switch 16, a full-wave rectified voltage is applied to the load. After the SCR becomes non-conductive, only a half-wave rectified voltage is applied to the load.

When input terminal 10 is positive with respect to terminal 12, current flows through diode 20a and a charge appears on capacitor 28 as shown. The charge path is through diode 20a, through capacitor 28, and principally, through diode 38 and resistor 36 to terminal 12. There is a current path in parallel with diode 38 and resistor 36. This path is through resistors 30 and 34. When diode 20a is not conducting, capacitor 28 will discharge through resistor 40. In addition, when input terminal 12 is the positive terminal, the discharge of capacitor 28 is aided by the current that flows through resistor 34, through resistor 30, through capacitor 28, to terminal 24, through the load 14, to terminal 26, through diode 20c, through switch 16, to the negative AC line terminal 10. The series combination of resistors 34 and 30 is such that the combined resistance is much greater than the resistance of resistor 36, and, when the circuit is operating, a net charge always appears on capacitor 28 with the terminal connected to terminal 24 being positive. When SCR 22 conducts current, its forward voltage drop is small and negligible current flows through resistors 36 and 30 to discharge capacitor 28.

Whenever the AC mains voltage on terminal 12 is high enough with respect to terminal 24 such that enough current can flow through resistor 34 and diode 32 to gate SCR 22 on, SCR 22 conducts load current. Further, it can be seen that capacitor 28 is charged when terminal 10 is positive with respect to terminal 12. When SCR 22 is conducting, capacitor 28 discharges primarily through resistor 40.

When the charge on capacitor 28 becomes sufficiently large, the cathode of SCR 22 remains positive with respect to the junction of resistors 34, 30, and the anode of diode 32 at all times and SCR 22 does not conduct. When this occurs, the output at terminals 24 and 25 becomes a half-wave rectified voltage instead of a full-wave rectified voltage.

When the voltage on capacitor 28 is approaching a value that prevents SCR 22 from firing, there are several cycles of conduction where SCR 22 conducts less than full-on. This "phased back" conduction period is always greater than 90° and causes only a small reduction of current during full-wave conduction time. The rate at which capacitor 28 acquires its charge is determined by the values of capacitor 28, of resistor 40, resistor 36 and the values of resistors 30 and 34. The values of resistors 40 and 36 are selected so that the voltage across capacitor 28 can become large enough to prevent firing of SCR 22 after an initial predetermined time.

All of these components are interdependent. If resistor 34 is selected too small, SCR 22 will conduct every cycle. If resistor 36 is too large, the same result will obtain. If resistor 40 is too small, again the charge on capacitor 28 will never become large enough to prevent the firing of SCR 22. Although the values of these components determine the number of cycles of conduction that takes place before the circuit automatically stops the conduction of SCR 22, the values can be easily calculated for various delay times.

In order to de-energize or reset, the switch 16 is opened which causes the capacitor 28 to discharge through the resistors 40, 30, and 34. The resistor 40 discharges capacitor 28 when power is removed from the input so that the circuit will start in a non-charged state and will perform as intended. By properly choosing the values of the capacitor 28 and the resistors 40, 30, and 34, one can control the amount of time or delay that will occur before the energy conserving circuit will be converted automatically from the full-wave rectification to the half-wave rectification after the closing of the switch 16. If a short delay is desired, the capacitor 28 is selected to be small and the resistor 40 is made large. On the other hand, when a longer delay is desired, the capacitor 28 is chosen to be relatively large, and the resistor 40 is made relatively small.

For completeness in the disclosure of the above energy conserving circuit, but not for the purposes of limitation, the following representative values and component identifications shown in FIG. 1 are submitted. These values and components were employed in a circuit that was constructed and tested and which provided a high quality performance. It should be clearly understood that those skilled in the art will recognize that many alternative elements and values may be employed in constructing the present invention.

| Part | Type or Value |
| --- | --- |
| Diodes 20a, 20b, 20c, 42 | 1N4004 |
| Diodes 32, 38 | 1N4002 |
| SCR 22 | MCR106-6 |
| Capacitor 28 | 10 Microfared |
| Resistor 34 | 47 Kilo-ohms |
| Resistor 30 | 10 Kilo-ohms |
| Resistor 36 | 27 Kilo-ohms |
| Resistor 40 | 65 Kilo-ohms |

The values listed above were used in an application in which the load was a 103 volts DC solenoid coil wherein a time delay of 1/6 of a second was obtained so as to minimize power dissipation after the initial pull-in. Generally, it is known that the pull-in force of a DC solenoid coil is many times greater than the hold-in force. Thus, great amounts of energy can be saved by reducing the applied power to a relatively low level after pull-in. In this example, it was determined that the solenoid coil consumed 53 watts of power during pull-in, but consumed only 15 watts after the turning off of the SCR 22.

Figure 2:
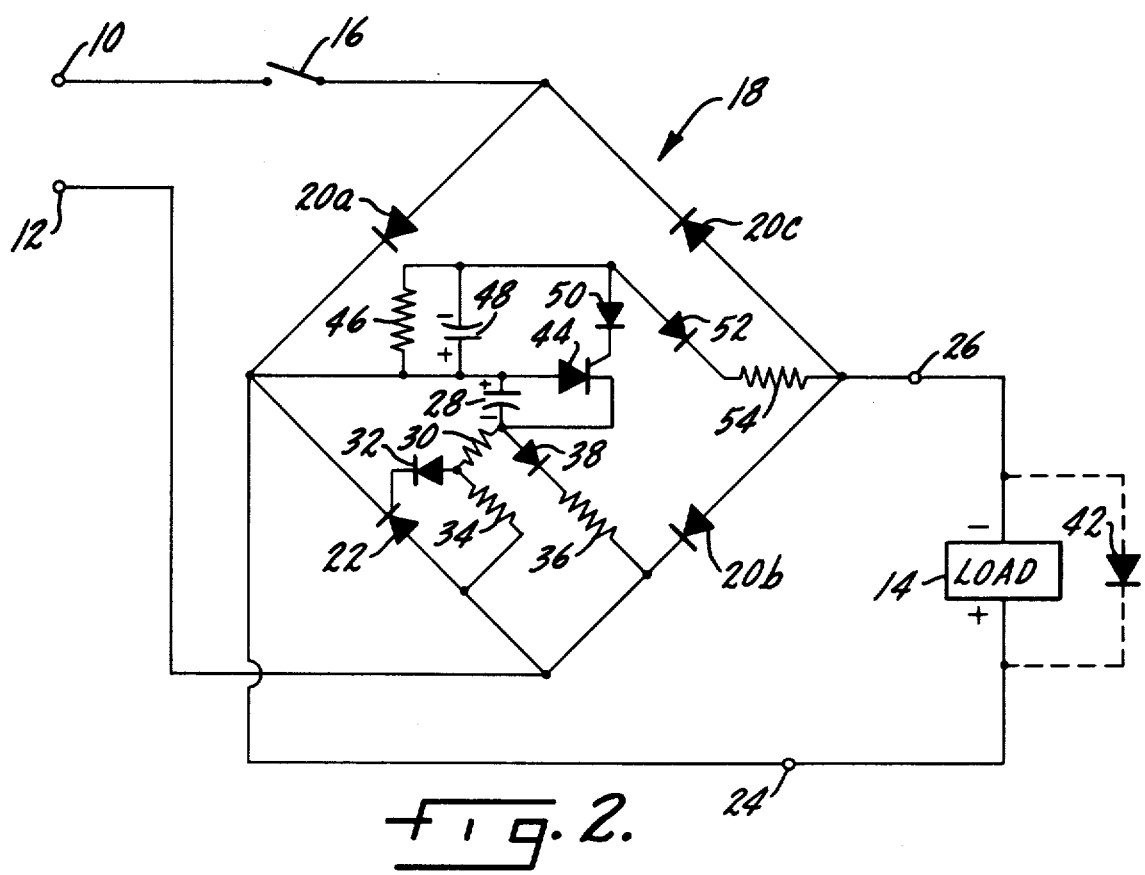
FIG. 2 is a modification of the energy conserving circuit shown in FIG. 1 which includes additional circuit elements for facilitating the quick discharge of the capacitor to reset the energy conserving circuit to its initial state.

FIG. 2 shows a modified form of an energy conserving circuit which is basically similar in configuration and operation to the circuit described hereinabove in connection with FIG. 1, except a circuit resetting means has been added to facilitate the rapid discharge of the capacitor 28 when power is removed from the input. The circuit of FIG. 1 will not reset completely until capacitor 28 becomes discharged to a value that is close to zero volts. If the voltage on the AC mains is turned off momentarily, the circuit, as described in FIG. 1, will not reset sufficiently to allow all of the necessary full-wave conduction period. If this occurs, the device may fail to actuate. The interconnection of the components are in the same manner as shown in FIG. 1, except that the resistor 40 is replaced by the resetting means. The resetting means include an auxiliary SCR 44 having its anode and cathode connected across the capacitor 28. The anode of the SCR 44 is also connected to ends of a resistor 46 and a capacitor 48 joined in parallel. The other ends of the resistor 46 and capacitor 48 are coupled in series to the anodes of diodes 50 and 52. The cathode of the diode 50 is connected to the gate of the auxiliary SCR 44, and the cathode of the diode 52 is coupled to one end of a resistor 54. The other end of the resistor 54 is coupled to the junction of the diodes 20b and 20c.

Since the conversion from full-wave rectification to half-wave rectification is identical to FIG. 1, only the operation of the auxiliary SCR 44 will now be described. When switch 16 is closed, full-wave rectified voltage appears across terminals 24 and 26 with terminal 24 positive with respect to terminal 26. This voltage charges capacitor 48 through diode 52 and resistor 54. Component values are selected so that capacitor 48 charges much more rapidly than capacitor 28.

The voltage on capacitor 48 is such that the anode of diode 50 has a negative voltage impressed on it and no current can pass into the control electrode of controlled rectifier 44 (shown here as an SCR) and the controlled rectifier will remain biased off.

As long as half-wave or full-wave voltage remains on terminal 24, capacitor 48 remains charged to a higher voltage than capacitor 28 and the voltage that is impressed on the gate of SCR 44 through diode 50, will remain negative with respect to its cathode. However, resistor 46, which is across capacitor 48, is selected so that if one complete cycle of AC voltage does not appear on the AC mains, resistor 46 will discharge capacitor 28 to a voltage less than the voltage across capacitor 28. When this occurs, the anode of diode 50, which reacts to the sum of the voltages across capacitor 48 and capacitor 28, becomes positive and gates SCR 44 to a conductive state. SCR 44 then rapidly discharges capacitor 28.

As an illustration of the values of the various components of FIG. 2 in which the capacitor 28 is discharged sufficiently to reset the circuit to essentially its initial condition in approximately seven milliseconds after the first missing voltage cycle, the following list of values is typical:

| Part | Type or Value |
| --- | --- |
| Diodes 20a, 20b, 20c, 42 | 1N4004 |
| Diodes 32, 38, 50, 52 | 1N4001 |
| SCR 22 | MCR106-6 |
| Capacitor 28 | 10 Microfared |
| Capacitor 48 | .1 Microfared |
| Resistor 34, 54 | 47 Kilo-ohms |
| Resistor 30 | 10 Kilo-ohms |
| Resistor 36 | 39 Kilo-ohms |
| Resistor 46 | 220 Kilo-ohms |

-continued

| Part | Type or Value |
| --- | --- |
| SCR 44 | MCR-120 |

The above circuit component values were selected to operate from 60 cycle AC mains. The delay time before changing to half-wave operation was selected as 1/6 second. For inputs at other frequencies and different delay periods, the proper component values can be easily calculated.

Figure 3:
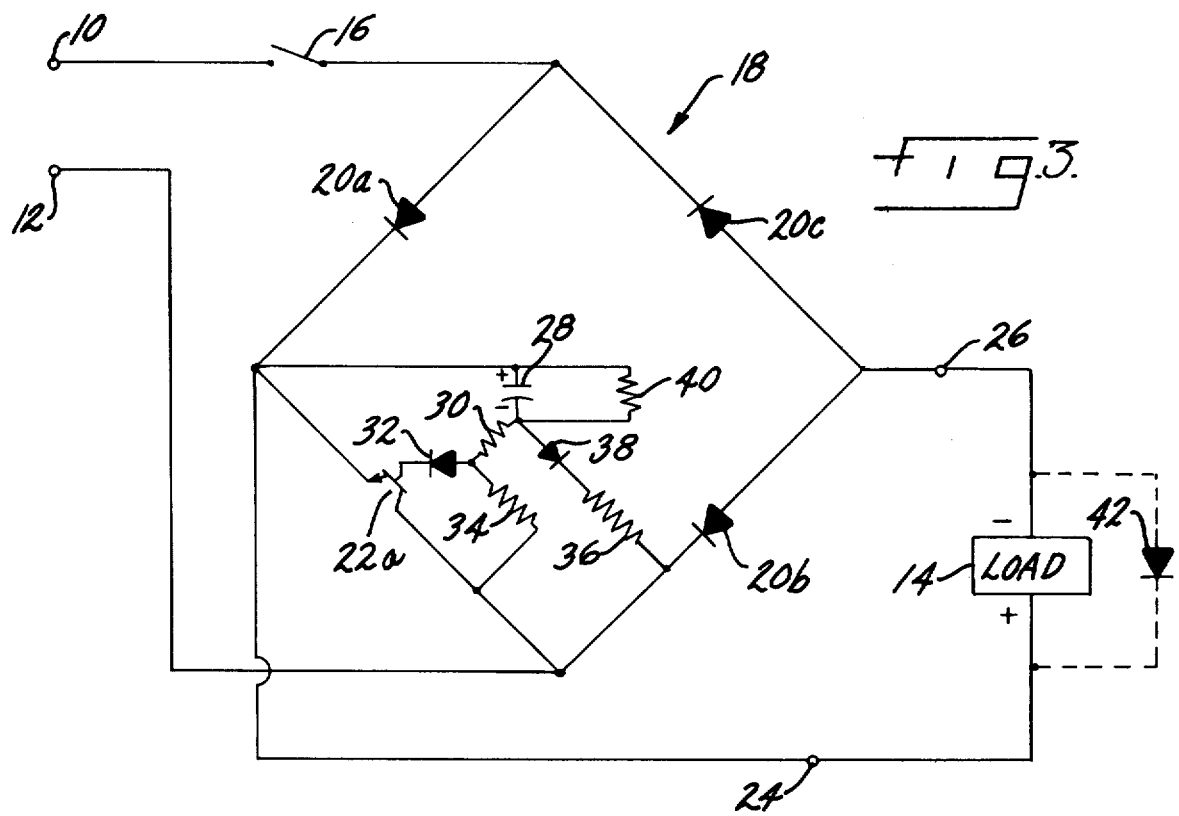
FIG. 3 is a schematic diagram similar to FIG. 1, but with a transistor 22a replacing the silicon controlled rectifier 22.
Figure 4:
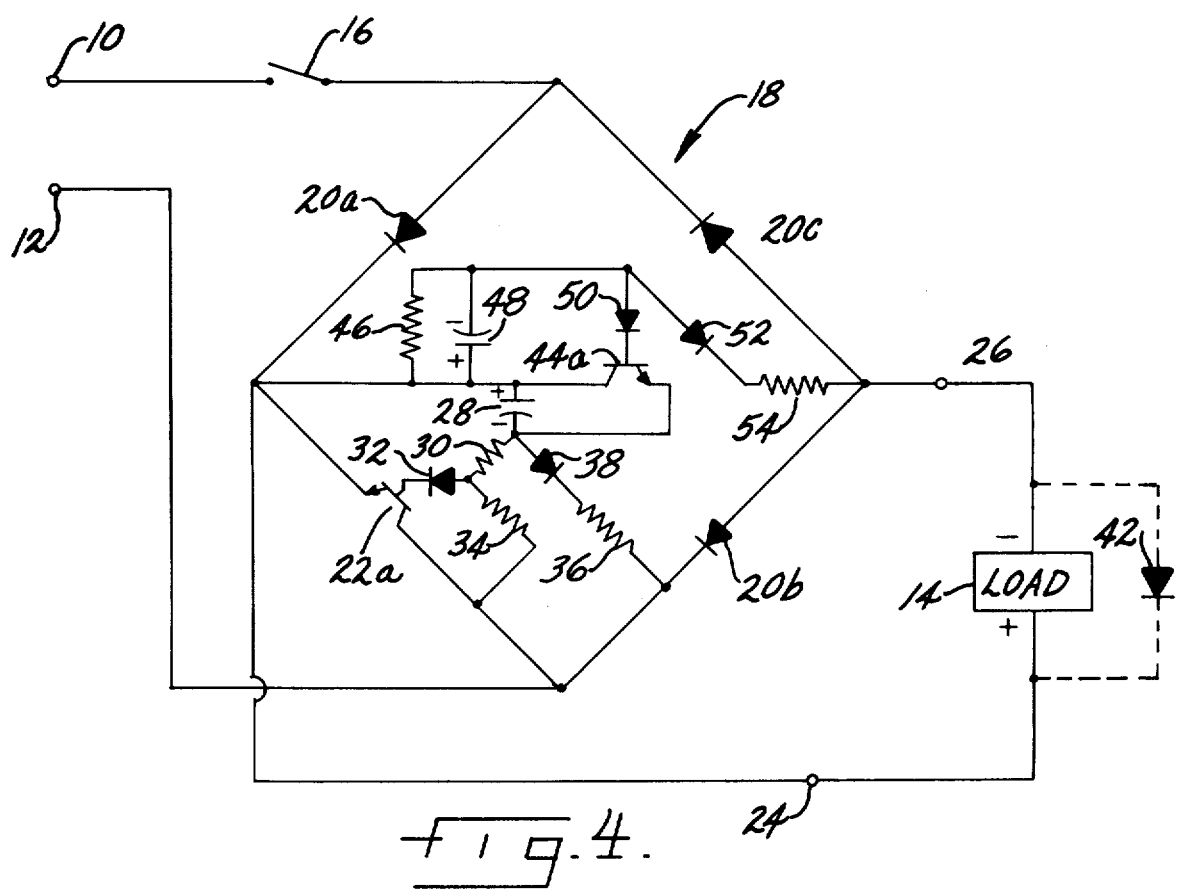
FIG. 4 is a schematic diagram similar to FIG. 2, but with transistors 22a, 44a replacing the silicon controlled rectifiers 22, 44 respectively.

It should be understood that while SCRs have been used in the circuits of FIGS. 1 and 2, transistors could have been used instead with no reduction in performance of the circuits. When transistors are used, the collectors and emitters thereof are connected across the respective capacitors. Specifically, when the silicon controlled rectifier 22 of FIG. 1 is replaced by a transistor its collector is connected to the resistor 34, its emitter is connected to the capacitor 28, and its base is connected to the diode 32. When the silicon controlled rectifier 44 of FIG. 2 is replaced by a transistor its collector is connected to the junction of capacitors 28 and 48, its emitter is connected to the diode 38, and its base is connected to the diode 50. A transistor 22a replaces the silicon controlled rectifier 22 of FIG. 1 and is illustrated in FIG. 3. Transistors 22a, 44a replace the silicon controlled rectifiers 22, 44 of FIG. 2 and are illustrated in FIG. 4. Except for the substitution of the transistors, FIGS. 3 and 4 are identical to FIGS. 1 and 2 respectively.

From the foregoing detailed description, it can thus be seen that the present invention provides an energy conserving circuit wherein a single silicon controlled rectifier in one leg of a bridge rectifier is gated off when a capacitor reaches a predetermined level so as to automatically convert a full-wave rectifier to a half-wave rectifier. Further, the present invention includes an auxiliary silicon controlled rectifier operatively connected to the capacitor so as to facilitate quick discharging of the same, thereby resetting the circuit to its initial condition upon even the slightest cessation of input power.

While there has been illustrated and described what is at present to be considered the preferred embodiments of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiments disclosed as the best modes contemplated for carrying out this invention, but that the invention will include all embodiments falling within the scope of the appended claims.

What is claimed is:

1. An energy conserving circuit adapted to convert automatically a full-wave rectified voltage fed to a DC load from an AC source to a half-wave rectified voltage after a predetermined time has elapsed, said circuit comprising:
   input means for connection to an AC source;
   output means;

a DC load operatively connected to said output means;

a bridge rectifier operatively coupled between said input and output means, said bridge rectifier comprising a first current path including a pair of diodes for conducting positive half-cycles of said AC source and a second current path including a silicon controlled rectifier for conducting negative half-cycles of said AC source;

control means operatively connected to the gate terminal of said silicon controlled rectifier and including a capacitor for turning off automatically the silicon controlled rectifier after a predetermined time has elapsed so as to reduce the power dissipation in said load, whereby both the positive and negative half-cycles of said AC source are applied to said load when said silicon controlled rectified is in the conductive state and only the positive half-cycles of said AC source is applied to said load when said silicon controlled rectifier is in the non-conductive state; and said control means further including:
  (i) a first resistor and a first diode connected in series with said capacitor, said first resistor having its one end connected to one end of said capacitor and having its other end connected to the anode of said first diode, the other end of said capacitor being connected to the cathode terminal of said silicon controlled rectifier, the cathode of said first diode being connected to the gate terminal of said silicon controlled rectifier,
  (ii) a second resistor having its one end coupled to the junction of said first resistor and said first diode and having its other end coupled to the anode terminal of said silicon controlled rectifier, and
  (iii) a second diode and a third resistor connected in series, the anode of said diode being coupled to the junction of said capacitor and said first resistor, the cathode of said second diode being coupled to one end of said third resistor, the other end of said third resistor being coupled to the anode terminal of said silicon controlled rectifier.

2. An energy conserving circuit as claimed in claim 1, further comprising switch means operatively connected to said input means for energizing and de-energizing said circuit.

3. An energy conserving circuit as claimed in claim 1, wherein said DC load comprises a solenoid coil.

4. An energy conserving circuit as claimed in claim 3, wherein a diode is operatively connected across said solenoid coil.

5. An energy conserving circuit as claimed in claim 1, further comprising resetting means operatively connected to said capacitor for rapidly discharging said capacitor so as to reset the circuit.

6. An energy conserving circuit as claimed in claim 5, wherein said resetting means including a switching device operatively connected to said capacitor.

7. An energy conserving circuit as claimed in claim 6, wherein said switching device comprises an auxiliary silicon controlled rectifier having its anode and cathode connected across said capacitor.

8. An energy conserving circuit as claimed in claim 6, wherein said switching device is a transistor having its collector and emitter connected across said capacitor.

9. An energy conserving circuit adapted to convert automatically a full-wave rectified voltage fed to a DC load from an AC source to a half-wave rectified voltage after a predetermined time has elapsed, said circuit comprising:

input means for connection to an AC source;

output means;

a DC load operatively connected to said output means;

a bridge rectifier operatively coupled between said input and output means, said bridge rectifier comprising a first current path including a pair of diodes for conducting positive half-cycles of said AC source and a second current path including a transistor for conducting negative half-cycles of said AC source;

control means operatively connected to the base terminal of said transistor and including a capacitor for turning off automatically the transistor after a predetermined time has elapsed so as to reduce the power dissipation in said load, whereby both the positive and negative half-cycles of said AC source are applied to said load when said transistor is in the conductive state and only the positive half-cycles of said AC source is applied to said load when said transistor is in the non-conductive state; and said control means further including:
  (i) first resistor and a second diode connected in series with said capacitor, said first resistor having its one end connected to one end of said capacitor and having its other end connected to the anode of said first diode, the other end of said capacitor being connected to the emitter terminal of said transistor, the cathode of said first diode being connected to the base terminal of said transistor,
  (ii) a second resistor having its one end coupled to the junction of said first resistor and said first diode and having its other end coupled to the collector terminal of said transistor, and
  (iii) a second diode and a third resistor coupled in series, the anode of said second diode being coupled to the junction of said capacitor and said first resistor, the cathode of said second diode being coupled to one end of said third resistor, the other end of said third resistor being coupled to the collector terminal of said transistor.

* * * * *